May 7, 1963

C. C. BROWN

WELL PACKER

Re. 25,381

Original Filed April 7, 1952

3 Sheets-Sheet 1

Cicero C. Brown
INVENTOR.

BY J. Vincent Martin
Joe E. Edwards
B. R. Pravel
ATTORNEYS

May 7, 1963

C. C. BROWN

WELL PACKER

Re. 25,381

Original Filed April 7, 1952

3 Sheets-Sheet 2

Cicero C. Brown
INVENTOR.

BY J. Vincent Martin
Joe E. Edwards
B. R. Pravel
ATTORNEYS

WELL PACKER

Original Filed April 7, 1952 3 Sheets-Sheet 3

Cicero C. Brown
INVENTOR.

BY J. Vincent Martin
Joe E. Edwards
B. R. Pravel
ATTORNEYS

United States Patent Office

Re. 25,381
Reissued May 7, 1963

25,381
WELL PACKER

Cicero C. Brown, 8490 Katy Road, Houston, Tex.

Original No. 2,765,853, dated Oct. 9, 1956, Ser. No. 280,971, Apr. 7, 1952. Application for reissue Dec. 28, 1961, Ser. No. 163,386
7 Claims. (Cl. 166—134)

Figure 1:
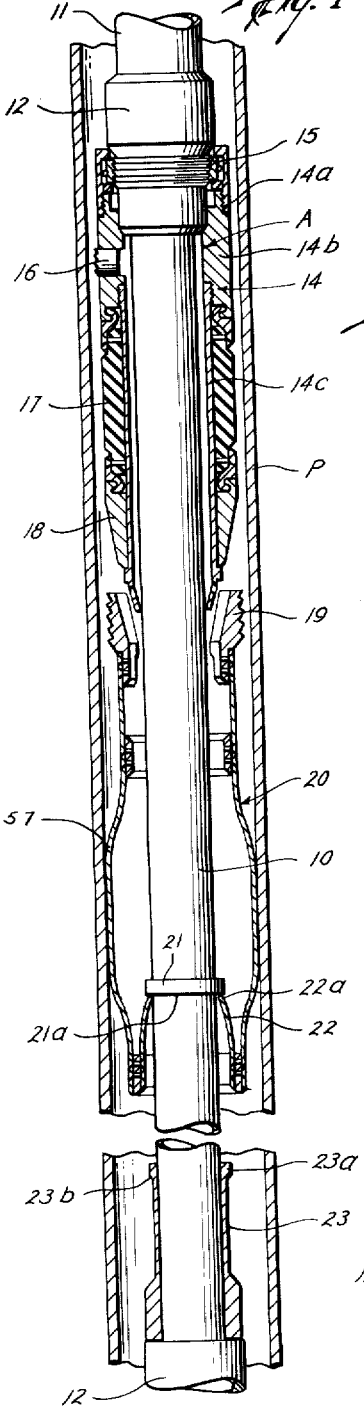

Matter enclosed in heavy brackets [ ] appears in the original patent but forms no part of this reissue specification; matter printed in italics indicates the additions made by reissue.

This invention relates to new and useful improvements in well packers.

One object of this invention is to provide an improved well packer apparatus which is adapted to be set within a well pipe and which is provided with an auxiliary anchoring means for preventing upward displacement of the packer from its set position by excessive pressure which may develop below said apparatus.

An important object of this invention is to provide a well packer having an auxiliary anchoring means associated therewith for locking the packer against upward movement within the well pipe after said packer has been moved into set position, said auxiliary anchoring means being operable by the pressure below the packer, whereby the presence of pressure below the packer which might otherwise be sufficient to displace the packer upwardly is utilized to urge the auxiliary anchoring means into firm locking position to prevent such upward displacement of the packer.

Another object of this invention is to provide an improved well packer wherein the packing means is disposed between two sets of slips, one of the sets of slips being adapted to be set in a well pipe by longitudinal movement of the tubular support therefor, and the other set of slips serving as an auxiliary pipe grippings means when there exists a pressure differential across the packing means after the packing means has been expanded to its sealing position with the well pipe, whereby said auxiliary slips prevent the premature release of the packing means and the first set of slips.

A particular object of this invention is to provide an improved well packer wherein the mandrel or support thereof is provided with a projection which co-acts with the slip carrier to move said carrier to a predetermined point in a well pipe after which setting of the slips may be accomplished; said projection being capable of functioning as a jarring means to effect release of the slips and the packing element when it is desired to move the packer from its set position within the well pipe.

A still further object is to provide a well packer apparatus which is adapted to be set within the well pipe in the usual manner with gripping slips holding the apparatus against downward movement, said apparatus having auxiliary anchoring means at its upper end together with a passage establishing communication between the anchoring means and the area below the apparatus when the apparatus is in its set position, whereby pressure from below said apparatus will move the auxiliary anchoring means into gripping position to lock the apparatus against upward displacement from its set position.

The construction designed to carry out the invention will be hereinafter described together with other features thereof.

Figure 2:
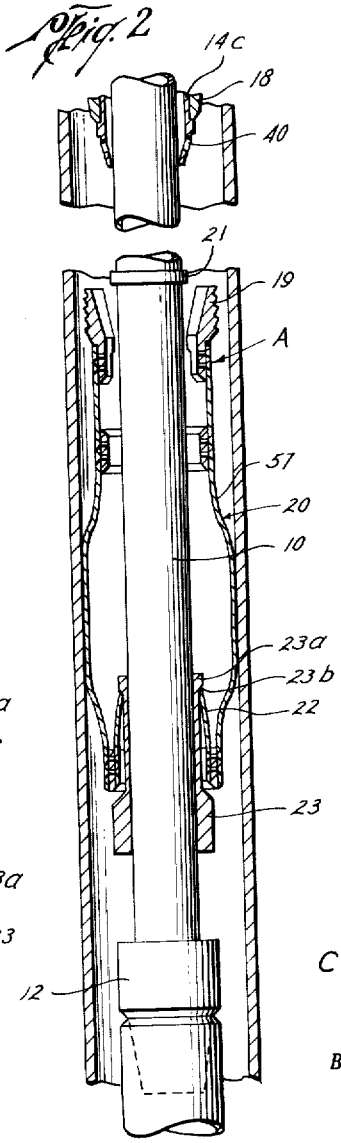
Figure 3:
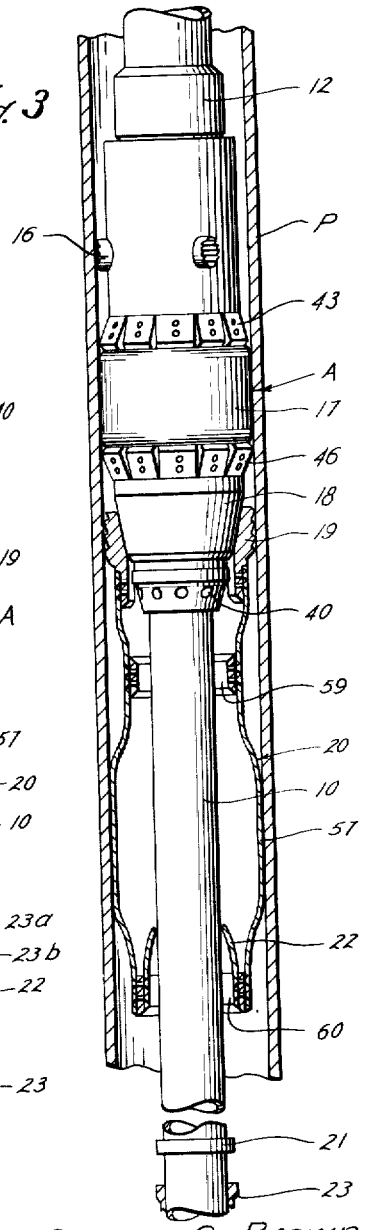
Figure 4:
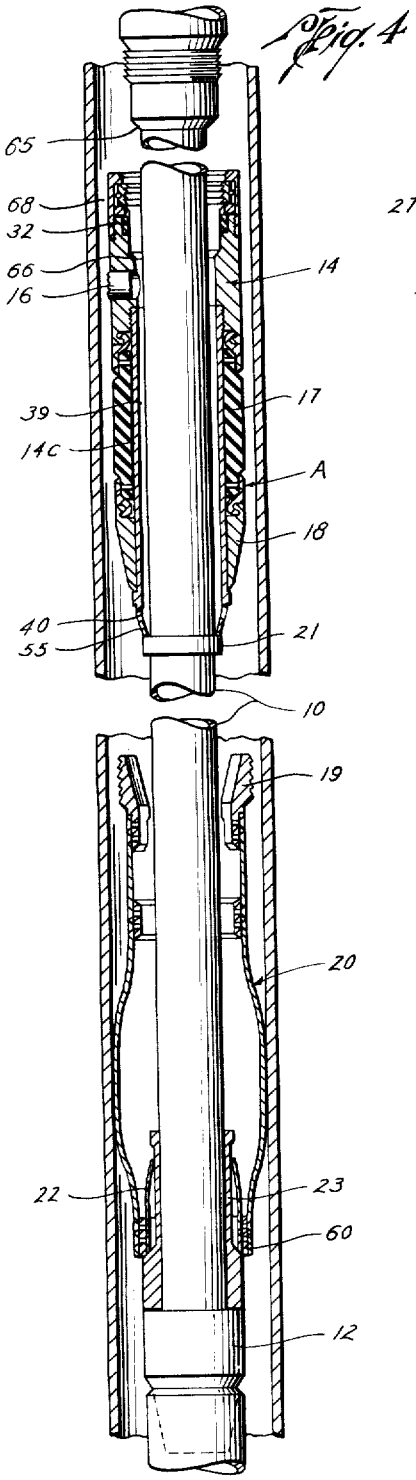
Figure 6:
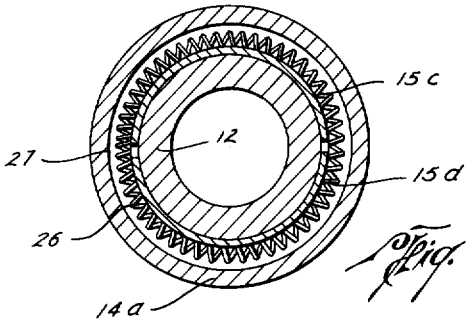
Figure 7:
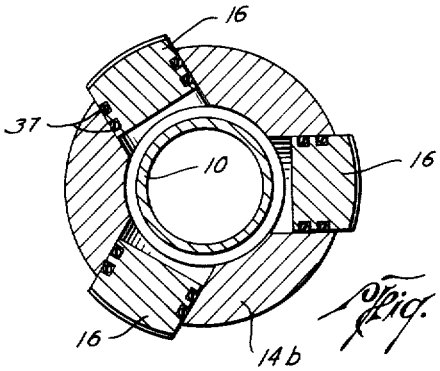
Figure 8:
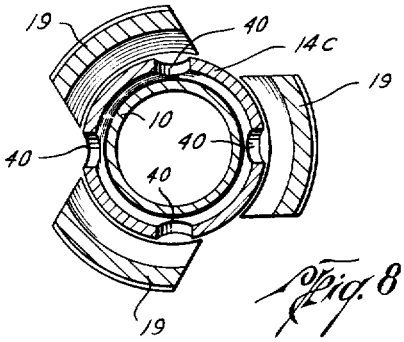
Figure 5:
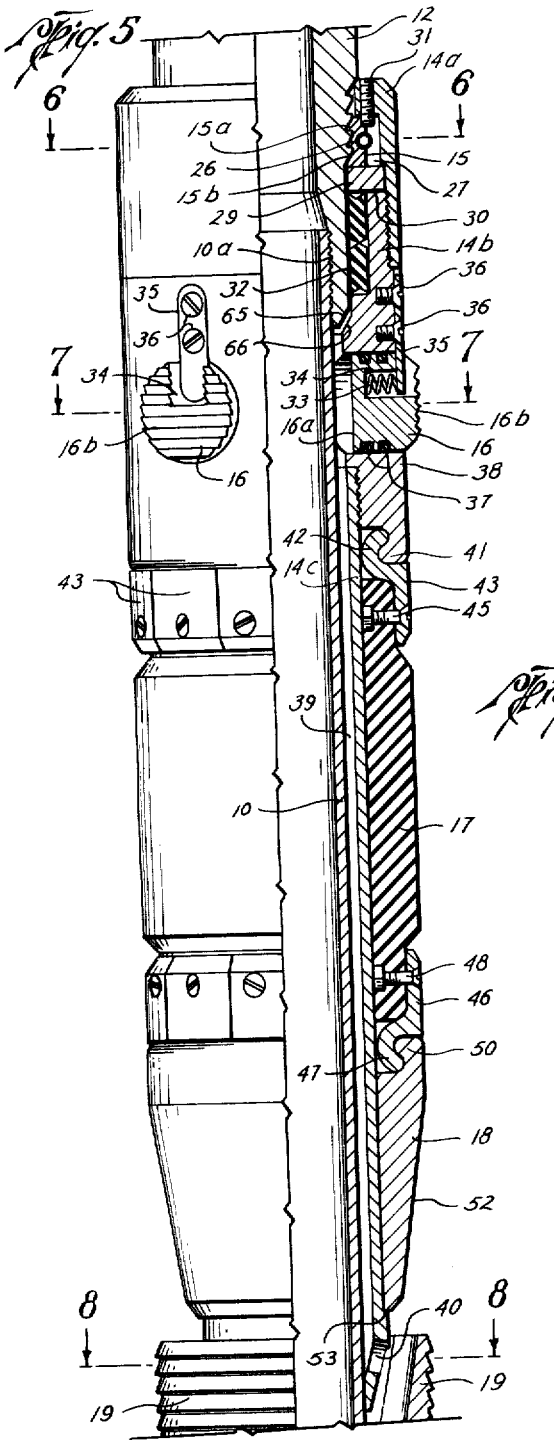
Figure 5:
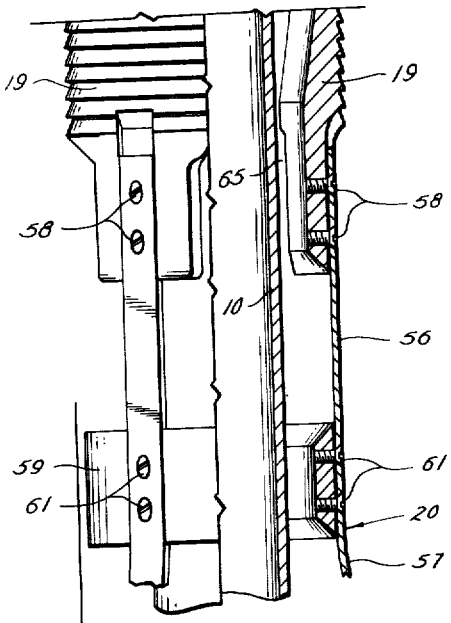
Figure 5A:
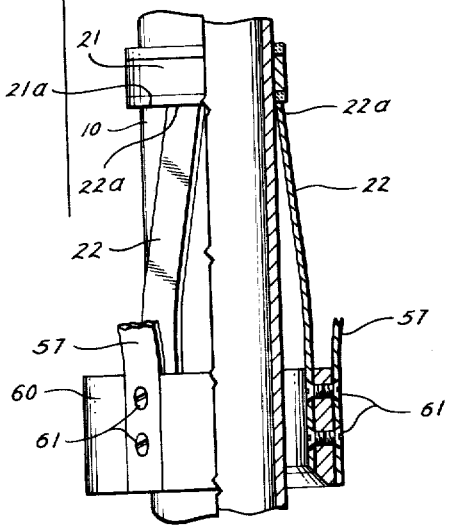

The invention will be more readily understood from a reading of the following specification and by reference to the accompanying drawings forming a part thereof, wherein an example of the invention is shown, and wherein:

FIGURE 1 is a longitudinal sectional view of the well packer of this invention, illustrating the relationship of the parts thereof as the well packer is inserted in a well pipe, FIGURE 2 is a partial longitudinal sectional view of the well packer of this invention, illustrating the relationship of the parts thereof during the release of the releasable connecting means between the friction spring member and the tubular support, FIGURE 3 is a longitudinal sectional view of the well packer of this invention, illustrating the relationship of the parts when the slips and the packing element are in their set position in the well pipe, FIGURE 4 is a longitudinal sectional view of the well packer of this invention, illustrating the relationship of the parts thereof when the threaded spear coupling has been disengaged and the slips and packing element have been retracted, FIGURES 5 and 5A are longitudinal veiws, partly in section and partly in elevation, which together illustrates the details of the improved well packer of this invention, FIGURE 6 is a horizontal sectional view taken on line 6—6 of FIGURE 5 and illustrating the details of the threaded spear type coupling, FIGURE 7 is a horizontal sectional view taken on line 7—7 of FIGURE 5 and illustrates particularly the auxiliary slips or anchoring means of this invention, FIGURE 8 is a horizontal sectional view taken on line 8—8 of FIGURE 5 and illustrating particularly the flow passage for the fluid in the well which serves to actuate the auxiliary slips when there is a differential of pressure above and below the packing element.

In the drawings, the letter A designates generally the improved well packer of this invention. The improved well packer A is adapted to be inserted within a well pipe P. The well packer A includes a tubular support 10 which is located in a pipe string and is adapted to be lowered by such pipe string or conductor 11 into the well pipe P. The tubular support 10 is connected to the pipe string 11 by conventional tool joints or couplings 12 and has connection with a sleeve support 14 through a releasable spear coupling 15. The sleeve support 14 is shown as composed of the parts 14a, 14b and 14c, although it will be appreciated that these parts may be integral if desired. Mounted in the sleeve support 14 is an auxiliary anchoring means or slips 16, the details of which will be described hereinafter. Mounted below the slips 16 is a packing means or element 17 with which is associated a slip expander 18.

The sleeve support 14 with its associated parts, namely, the auxiliary slips 16, the packing element 17, and the slip expander 18, are longitudinally or axially movable with respect to the tubular support 10 but they are normally held in fixed relationship to the tubular support 10 by the spear coupling 15. Below the sleeve support 14 and its associated parts there is located the main anchoring means or slips 19 which are carried by friction spring means 20. The friction spring means 20 and the slips 19 are floating, that is, they are movable axially or longitudinally with respect to the tubular support 10.

The slip expanders 18 and the slips 19 are prevented from telescoping during the insertion of the well packer A into the well pipe P by reason of a projection or collar 21 on the tubular support 10. This projection or collar 21 has its lower edge abutting with resilient fingers 22 connected to the resilient spring means 20. Such collar 21 and resilient fingers 22 together serve as a connecting means between the friction spring means 20 and the tubular support 10 of the well packer A into the pipe P. Mounted on the tubular support 10 below the collar 21 is a sleeve 23 which serves as a releasing means for the connection between the collar 21 and the resilient fingers 22. The details of the construction and operation thereof will be described hereinafter.

The details of the well packer of this invention are shown particularly in FIGURES 5–8, FIGURES 5 and 5A showing the detailed construction of substantially the complete well packer. In FIGURE 5 it can be seen that the tubular support 10 is threaded at 16a to the tool joint section 12 which has threads 15a thereon. These threads 15a engage with the threads 15b on semicircular segments 15c and 15d surrounding section 12 and within sleeve support 14 to form the threaded spear coupling 15. As is clearly illustrated in FIGURE 6, the two semicircular segments 15c and 15d are urged together by a circular spring 26, which fits into an annular notch in the periphery of the segments 15c and 15d. There is a space 27 between the exterior of the segments 15c and 15d and the interior of the tubular support 14 to permit the segments 15c and 15d to separate when the threads 15a on the tool joint section 12 are speared downwardly against the threads 15b. This permits a quick coupling between the threads 15a and 15b but requires the rotation of the tool joint 12 and its tubular support 10 connected therewith in order to release the connection 15.

The releasable coupling segments 15c and 15d rest on an annular plate 29, which plate rests upon a shoulder 30 of the portion 14b of the sleeve support 14. The segments 15c and 15d are retained in centered position within the portion 14a of the tubular sleeve 14 by set screws 31. Below the plate 29 are seal rings or elements 32 which are disposed between the sleeve support 14 and the tool joint section 12 which in combination with the valve formed by shoulder 65 and seat 66 prevent the flow of fluid thereabove when coupling 15 is engaged. Mounted on the sleeve support 14 are the auxiliary anchor means or slips 16 which are normally retained in retracted position by a spring 33 which fits within a recess 34 in the slips 16. This spring 33 abuts against a flat plate 35 which is secured to the sleeve support 14 by screws 36 or similar securing means. These slips 16 function as small pistons in that they are urged outwardly into a pipe-gripping position against the action of the spring 33 when the fluid pressure on the rear face 16a is greater than the pressure on the outside surface 16b where the gripping teeth are located.

To prevent the escape of fluid exerting such pressure on the rear face 16a of the slips 16, seal rings 37 are provided in annular notches about the periphery of the slips 16. It will be observed that the rear face 16a of the slips 16 is spaced from the outside surface of the tubular support member 10. This space behind the face 16a is in communication with and forms a part of the annular space or passage 39 between the sleeve support 14 and the tubular support 10. The lower portion of the tubular support 14 has an opening 40 therein to permit the flow of fluid in the well pipe upwardly through the passage or space 39 so as to actuate the slips 16 when there is a sufficient pressure differential thereon. The pressure differental must be such that the pressure on the rear surface 16a of the slips 16 is greater than the pressure on the outer surface 16b so that the force exerted by the spring 33 may be overcome to move the slips 16 into pipe-gripping position with the well pipe P.

Threadedly connected to the portion 14c of the sleeve support 14 is a ring 38 which has inwardly directed hook 41. This inwardly directed hook 41 is engaged by hook portions 42 of the curved segments 43. These segments 43 are connected to the packing element 17 which is composed of a flexible or resilient material, such as rubber or any of its equivalents. This connection between the curved segments 43 and the packing element 17 is preferably made with bolts and associated nuts 45, although it will be appreciated that other suitable securing means could be utilized. At the lower end of the packing element 17 are curved segments 46 which are identical with the curved segments 43 and have identical hook portions 47. These curved segments 46 are likewise secured to the packing element 17 by bolts and nuts such as 48.

It should be noted that the packing element 17 is not attached to the outer surface of the sleeve 14c of the sleeve support 14 but instead is free to move therefrom by pivotal action of the hooks 42 and 47. The hooks 42 pivot outwardly in the inwardly directed hooks 41 when the packing element is expanded or moved away from the sleeve 14c to its expanded sealing position with the well pipe P. Similarly, the hooks 47 pivot in hooks 50 on a slip expander 18 which are located therebelow.

This slip expander 18 is of conical construction and thus is wedge-shaped in cross-section, having an inwardly tapered outer surface 52. The expander 18 is also free to move on the sleeve 14c but it is restrained against downward movement relative to the sleeve 14c of the sleeve support 14 by the annular shoulder 53 formed on the lower edge of the sleeve 14c above the opening 40.

Positioned below the slip expander 18 and entirely disconnected therefrom are the main anchoring means or slips 19. These slips 19 are of conventional construction and are carried by extensions 56 of the friction spring members 57 forming part of the friction spring means 20. The extensions 56 are secured to the slips 19 by screws 58 or other suitable securing means. The resilient springs 57 are themselves supported by guide rings 59 and 60 to which the resilient springs 57 are secured by any suitable securing means, such as the screws 61 illustrated in FIGURE 5A. The friction spring means 20 is so constructed that the resilient springs 57 are bowed outwardly as shown in FIGURES 1–4, so as to always engage the inner surface of the well pipe P. On the guide ring 60 are inwardly directed resilient fingers 22 which by reason of their resilience are urged into contact with the tubular support 10 so that their upper edges from a seat for the lower edge 21a of the collar 21. This collar 21 is welded or otherwise affixed to the tubular support 10. The seating between the upper edges 22a of the fingers 22 and the lower edges 21a of the collar 21 provides a releasable connection therebetween during lowering of the tubular support 10.

It will be observed that there is no connection between the friction spring means 20 or the slips 19 and the tubular support 10, except through the engagement of the fingers 22 and the projection or collar 21. Such engagement forms a releasable connection for the lowering of the well packer into the well pipe, as above mentioned. It should also be noted that the slips 19 are sufficiently spaced from the tubular support 10 so that there is an annular passage 65 therebehind, which permits fluid from below such slips 19 to pass upwardly through the opening 40 and through the annular passage 39 to a point behind the slip 16 even when the slip expander 18 has been moved into engagement with the slips 19 to move them into their set position.

The operation of the well packer A of this invention can best be seen by a comparison of FIGURES 1–4, wherein various stages of the operation are illustrated. Referring now to FIGURE 1, therein can be seen the relationship of the parts of the well packer as they are inserted into a well pipe P. When such positioning is being accomplished, the releasable coupling 15 is connected so that the sleeves 14 are retained in fixed position relative to the tubular support 10. In this position the slips 16, the packing element 17 and the slip expander 18 are all in retracted position. The slip expander 18 and the slips 19 are prevented from telescoping during such insertion of the well packer into the well pipe by engagement of the resilient fingers 22 with the collar 21. Such engagement of the collar 21 with the fingers 22 urges the friction spring means 20 downwardly to the predetermined point at which it is desired to set the packer within the well pipe.

When it is desired to set the slips 19 in the well pipe P, the tubular support 10 is moved upwardly by raising of the pipe string or conductor 11 at the surface of the well. Such longitudinal movement of the tubular support 10 also raises the collar 21 from engagement with the resilient fingers 22, as best seen in FIGURE 2. Additionally, the sleeve 23 which serves as the release means is raised upwardly with the movement of the tubular support 10 so that it is forced past the spring fingers 22 and assumes the position shown in FIGURE 2. This sleeve spring 23 has a flange 23a which is of the same diameter as the diameter of the collar 21. The lower edge 23b of such flange tapers upwardly and outwardly. It will be appreciated that when the tubular support 10 is raised, the friction spring means 20 will be prevented from moving upwardly therewith since there is no connection therebetween and since the resilient spring members 57 are in friction contact with the inside of the well pipe P.

After the sleeve 23 has assumed the position shown in FIGURE 2 by the upward longitudinal movement of the tubular support 10, then the tubular support 10 is moved downwardly so that the collar 21 is brought into contact with the flange 23a of the sleeve 23. This downward force is continued and due to the beveled surfaces 23b of the sleeve 23, the fingers 22 are moved radially outwardly and will pass on the outside of the flange 23a as it moves downwardly. Since the collar 21 is of the same diameter as the flange 23a, the springs 22 are thus held in their expanded position and this permits the collar 21 to slide or move below such fingers 22, thereby releasing the initial connection between the collar 21 and the fingers 22 which was utilized in the lowering of the well packer.

In FIGURE 3 it can be seen that the collar 21 has passed below the fingers 22, permitting the slip expander 18 to engage the inner surfaces of the slips 19 and force them into pipe-gripping position with the well pipe P. After the slips 19 are thus set, continued downward movement of the tubular support 10 urges the packing element 17 into its expanded position as shown in FIGURE 3, so that the well pipe P is sealed off by such packing element. It will be observed in FIGURE 3 that the curved segments 43 and 46 have pivoted outwardly during such expansion of the packing element 17.

Under normal conditions, the well packer is then in its set and sealed off position in the well pipe. However, if the pressure below the packing element 17 exceeds the pressure thereabove there is a tendency for such pressure to move the expander upwardly out of the slips which would result in an unsetting or release of the apparatus and to obviate this release, the auxiliary slips or anchor means 16 have been provided. These slips 16 having their rear faces exposed to pressure below the packer through passage 39 and openings 40 (FIGURE 5) are urged outwardly by such pressure into pipe-gripping position at any time that there is a sufficient differential of pressure across the packing means 17. It is evident that a greater pressure below the packing element 17 than thereabove will cause a differential of pressure to exist across the slips 16 and such differential of pressure overcomes the spring 33 to force the slips 16 in piston-like action into gripping contact or engagement with the inside of the well pipe P to thereby prevent any upward or unseating movement of the packing element 17 or the upward displacement of the slip expander 18 from within the slips 19. *Since there is no direct communication between the bore of the support 10, which forms part of the pipe string, and the annular passage 39, the auxiliary slips 16 are moved into gripping position whenever the pressure in the well bore below the well packer is higher than the pressure in the well bore above the packer. If there should be a pressure present in the pipe string and conductor 10 which is different than the pressure in the well bore below the packer, such different pressure cannot affect the operation of said slips 16.*

When it is desired to release the well packer from the well pipe, the pressures above the packing element 17 and therebelow are equalized to retract the slips 16. As best seen in FIGURE 4, this release is accomplished by disengagement of the threaded coupling 15 by rotation of the tubular support 10, and then movement of the support 10 upwardly until the shoulder 65 is raised off the valve seat 66 and is moved above the seal ring 32, whereby well fluid from passage 39 may pass upwardly into the area 68 above the auxiliary slips 16. Then, the pressure above and below the slips 16 is the same, whereby each spring 33 urges each of the slips 16 into the retracted position. Upon continued upward movement of the tubular support 10 a jarring action is imparted to the slip expanders 18 and the packing element 17 by reason of the contact of the collar or projection 21 on the tubular support 10 with the lower edge 55 of the sleeve support 14. After the jarring has been obtained, the friction springs 20 will then be urged upwardly and moved along with the slips 19 due to the seating of the sleeve 23 on the lower edge of the guide ring 60. Thus, all of the parts will be positively moved upwardly by movement of the tubular support 10 and there will be a positive means for retracting all of the elements which are in pipe-engaging position during the use of the well packer in the pipe.

It will be appreciated that the device of this invention is adaptable for use with other types of packers and slips than those illustrated and described herein.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. A well packer for use within a well pipe, comprising a central tube, a packing member mounted on said tube, a first set of slips mounted on said tube below said packing member, a second set of slips mounted on said tube above said packing member, said second set of slips having its exterior surface exposed to fluid pressure in the well pipe above said packing member, means to expand said packing member into sealing engagement with the well pipe, passage means estabilshing fluid communication between the area adjacent the inner surface of said second set of slips and the area outside the central tube below said packing member at all times, whereby said second set of slips is movable into gripping contact with the well pipe when the fluid pressure in the pipe below the expanded packing member exceeds the pressure thereabove.

2. In a well packer having a support pipe, slips mounted on said support pipe, means to set said slips in gripping engagement with a well pipe, a packing means on said support pipe, and means for expanding said packing means into sealing engagement with the well pipe after said slips are set, the improvement residing in auxiliary slip mounted on the opposite end of the support pipe from said slips and above said packing means, said auxiliary slip having its exterior surface exposed to the fluid pressure above said packing means and its interior surface exposed to the fluid pressure below said packing means, and means for establishing fluid communication between the rear of said auxiliary slips and the area in the well pipe below the packing means to direct the fluid in the well pipe to said auxiliary slip so as to set same when the pressure of the fluid in the well pipe above the packing means is less than the pressure therebelow.

3. A well packer for sealing off a section of well pipe, including a tubular support, resilient friction means slidably mounted on said tubular support, a set of slips carried by said friction means, coacting means on said friction means and said tubular support connecting said friction means to said tubular support for lowering said friction means to a predetermined point in a well pipe, means on said tubular support for releasing said coacting means upon longitudinal nonrotative movement of said tubular support with respect to said friction means, and slip expanders on said tubular support for setting said slips after the release of said coacting means.]

[4. The device as set for in claim 3, wherein the coacting means includes a projection on the tubular support and resilient fingers on the friction means, said fingers being positioned below the projection during the lowering of the friction means to said predetermined point.]

5. An improved well packer having a tubular support, a packing means disposed between two sets of slips on said tubular support, means on said tubular support for actuating the first of said sets of slips into gripping position with a well pipe upon a longitudinal movement of the tubular support relative to said first set of slips, the second of said sets of slips being an auxiliary pipe gripping means including means establishing fluid communication between the rear of said second set of slips and the area in the well pipe below the packing means to direct the well fluid to the said second set of slips so as to set same into gripping position with the well pipe by a differential fluid pressure across the packing element when said element is in sealing engagement with the well pipe, such auxiliary gripping means serving as a safety device to prevent the premature release of the packing element and said first of said sets of slips from their set position in the well pipe.

6. An improved well packer for use in a well pipe including a tubular member connected in a pipe string, a sleeve support mounted on said tubular member with a space therebetween, said sleeve support carrying an auxiliary set of fluid pressure actuatable slips, a packing element, and a slip expander, a friction spring means detachably connected to said tubular member, another set of slips carried by the friction spring means and being actuatable into gripping position with the well pipe by telescoping with said slip expander upon longitudinal movement of the tubular member, and said space between the sleeve support and tubular member serving as a passage for the flow of well fluid behind said auxiliary set of slips to force same into gripping position with the well pipe when there exists a differential pressure above and below said packing element when in a sealing position with the well pipe.

*7. A well packer for use within a well pipe comprising, a central tube, a support sleeve surrounding the tube, means connecting the tube and the sleeve to each other, a packing member mounted on said sleeve, a first set of slips mounted on said tube below said packing member, a slip expander carried by the tube and coacting with said first set of slips to anchor the same to the well pipe upon relative longitudinal movement of the tube with respect to said slips, means connected with the tube and engaging the upper end of the packing member for applying endwise force to expand said packing member into sealing position upon continued movement of said tube relative to the anchored slips, a second set of slips mounted for lateral movement on said sleeve above said packing member, said second set of slips having its exterior surface exposed to fluid pressure in the well pipe above said packing member, passage means located between the central tube and the support sleeve establishing fluid communication at all times between the area adjacent the inner surface of said second set of slips and the area outside the central tube below said packing member, whereby said second set of slips is movable into gripping contact with the well pipe when the fluid pressure in the pipe below the expanded packing member exceeds the pressure thereabove.*

*8. In a well packer having a support pipe, slips mounted on said support pipe, expander means attached to said pipe and coacting with the slips upon relative longitudinal movement of the expander with respect to the slips to set said slips in gripping engagement with a well pipe, a packing means mounted on said support pipe, and means for expanding said packing means into sealing engagement with the well pipe after said slips are set, the improvement residing in radially movable auxiliary slip members mounted on the opposite end of the support pipe from the first mentioned slips and located above said packing means, each auxiliary slip having its exterior surface exposed to the fluid pressure above said packing means, a sleeve surrounding the pipe and having its bore spaced from the exterior of the pipe to form an annular passage surrounding the support pipe to establish fluid communication between the rear of all of said auxiliary slips and the area in the well pipe below the packing means to direct the fluid pressure in the well pipe to said auxiliary slips so as to set the same when the pressure of the fluid in the well pipe above the packing means is less than the pressure therebelow.*

*9. A well packer for use within a well pipe comprising, a central tube connected in a well fluid conductor string to form a part thereof, a support sleeve surrounding said central tube and having a bore of larger diameter than the exterior of said central tube whereby an annular flow passage is formed between the central tube and said sleeve, a coupling connecting the upper end of said support sleeve to said central pipe and also having means for closing the upper end of said annular flow passage formed between the sleeve and central tube, a packing member mounted on said support sleeve, a first set of slips mounted on said tube below the packing member, a slip expander carried by the tube and coacting with said first set of slips to anchor the same to the well pipe upon relative longitudinal movement of the tube with respect to said slips, means connected with the tube and engaging the upper end of the packing member for applying endwise force to expand said packing member into sealing position upon continued movement of said tube relative to the anchored slips, a second set of slips mounted for radial movement on said sleeve above the packing member and having the inner surfaces thereof exposed to the pressure in the annular passage formed between the central tube and sleeve, the exterior surface of said second set of slips being exposed to the fluid pressure in the area above the packing member and outside of the central tube and well fluid conductor, and means establishing communication between the area below the packing member outside of said central pipe and well fluid conductor string and the annular passage, whereby after the packer member is expanded and the first set of slips has moved into gripping engagement with the well pipe, the second set of slips is movable into gripping contact with the well pipe when the fluid pressure in the well pipe below the expanded packing member exceeds the pressure thereabove.*

References Cited in the file of this patent or the original patent

UNITED STATES PATENTS

| | | |
|---|---|---|
| 625,648 | Darling | May 23, 1899 |
| 764,769 | Robinson et al. | July 12, 1904 |
| 881,154 | Robinson | Mar. 10, 1908 |
| 2,159,640 | Strom | May 23, 1939 |
| 2,379,394 | Young | June 26, 1945 |
| 2,389,985 | Justice et al. | Nov. 27, 1945 |
| 2,467,801 | Baker | Apr. 19, 1949 |
| 2,578,900 | Ragan | Dec. 18, 1951 |